United States Patent
Kadonaga et al.

(10) Patent No.: US 6,846,439 B2
(45) Date of Patent: Jan. 25, 2005

(54) PROCESS FOR PRODUCING POROUS POLYMER

(75) Inventors: Kenji Kadonaga, Takatsuki (JP); Kenji Minami, Otsu (JP)

(73) Assignee: Nippon Shokubai Co., Ltd., Osaka (JP)

( * ) Notice: Subject to any disclaimer, the term of this patent is extended or adjusted under 35 U.S.C. 154(b) by 53 days.

(21) Appl. No.: 10/149,776

(22) PCT Filed: Sep. 12, 2001

(86) PCT No.: PCT/JP01/07905

§ 371 (c)(1),
(2), (4) Date: Jun. 13, 2002

(87) PCT Pub. No.: WO02/32987

PCT Pub. Date: Apr. 25, 2002

(65) Prior Publication Data

US 2002/0193510 A1 Dec. 19, 2002

(30) Foreign Application Priority Data

Oct. 13, 2000  (JP) ........................................ 2000-313020

(51) Int. Cl.$^7$ .............................................. B29C 67/20
(52) U.S. Cl. .............................. 264/48; 264/51; 521/64
(58) Field of Search ............................. 521/64; 264/51, 264/48, 158

(56) References Cited

U.S. PATENT DOCUMENTS

| 4,663,222 A | * | 5/1987 | Ohue et al. .................... 442/35 |
| 5,147,345 A | | 9/1992 | Young et al. |
| 6,299,808 B1 | * | 10/2001 | Mork et al. ................. 264/46.1 |
| 6,362,243 B1 | * | 3/2002 | Sasabe et al. .................. 521/64 |

FOREIGN PATENT DOCUMENTS

| EP | 685512 | 12/1995 |
| EP | 878481 | 11/1998 |
| JP | 51-146568 | 12/1976 |
| JP | 58-25936 | 2/1983 |
| JP | 63-151435 | 6/1988 |
| JP | 6-192456 | 7/1994 |
| JP | 2000-17104 | 1/2000 |
| JP | 2001-49022 | 2/2001 |

* cited by examiner

*Primary Examiner*—Allan R. Kuhns
(74) *Attorney, Agent, or Firm*—Fish & Richardson P.C.

(57) ABSTRACT

This invention, with the object of producing a porous polymer from a water-in-oil type high internal phase emulsion, provides a method for the production of a porous polymer comprising a step of applying a physical treatment such as shaving to the surface of a porous polymer obtained by polymerizing the emulsion. By the physical treatment, it is made possible to diminish the difference in texture between the surface part and the inner part of the porous polymer and improve efficiently the absorption property of the porous polymer.

16 Claims, 1 Drawing Sheet

PROCESS FOR PRODUCING POROUS POLYMER

TECHNICAL FIELD

This invention relates to a method for the production of a porous polymer by the polymerization of a water-in-oil type high internal phase emulsion (hereinafter occasionally referred to as "HIPE") obtained by mixture with water in the presence of a surfactant, preferably a method for the production of a porous polymer possessing continuous bubbles (hereinafter occasionally referred to as "open cells") having through holes formed in the surface and the interior thereof, and more particularly a method for producing highly efficiently a porous polymer having improved the characteristic properties thereof such as rate of liquid permeation, absorbency and capacity for liquid absorption, absorption volume, and capacity for liquid absorption with a high freedom of selectivity regarding the composition of HIPE, the apparatus for polymerization, and the conditions of polymerization.

The porous polymer of this invention can be extensively utilized as (1) liquid absorbents; such as ① cores of disposable diapers, i.e. absorbents for such body fluids as urine and blood and ② treating agents for waste water and spent oil and treating agents for waste solvents, i.e. absorbents for water, aqueous liquids, oils, and organic solvents, (2) energy absorbents, such as sound insulators and heat insulators for automobiles and buildings, i.e. absorbents for sound and heat and (3) bases for chemical agents, such as household goods impregnated with aromatizing agents, detergents, polishing agents, surface protecting agents, and flameproofing agents.

BACKGROUND ART

The term "HIPE" refers to such an emulsion as has a water phase, namely the dispersed phase (internal phase), and an oil phase, namely the external phase, at a ratio (W/O) of not less than about 3/1. The fact that a porous polymer is produced by the method of polymerizing this HIPE (which will be referred to as "HIPE method" hereinafter) has been known to the art. The porous polymer produced from the HIPE is excellent because it tends to grow into a porous polymer of low density possessed of open cells of a fine diameter, whereas the porous polymer produced by using a foaming agent without being converted into the HIPE tends to grow into a porous polymer possessed of discrete cells of a comparatively large diameter.

The porous polymer is utilized for water absorbent, oil absorbent, sound insulator, filter, and so forth. Whichever of such applications may be chosen, the porous polymer will possibly suffer deficiency in absorbency and filtering efficiency unless it has through holes formed in the surface and in the interior thereof. In the production of the porous polymer from the HIPE, however, the so-called skin layer will be possibly formed in the interface of contact between the polymerization vessel and the HIPE owing to the action of the quality of material of such a device as the polymerization vessel which is exposed to the HIPE. This skin layer is known to degrade the numerical aperture of the porous polymer and exert adverse effects on the liquid permeability, filtering property, and absorbency of the porous polymer. When the skin layer is formed on the surface of the porous polymer, the entire surface layer of the porous polymer may be wholly sliced and discarded. When this measure is adopted, however, the slicing will remove part of the internal texture of the porous material and entail a dramatic reduction in the yield of product.

It is, therefore, an object of this invention to provide a method for the production of a porous polymer by the polymerization of the HIPE which is free from such conventional technical problems as mentioned above and more particularly to provide a method for producing highly efficiently a porous polymer having a small difference in texture between the interior and the surface of the porous polymer to be produced and possessing excellent characteristic properties (such as, for example, the liquid passing property and the absorbency of the porous polymer) with high degree of freedom of selection regarding the composition of the HIPE, the apparatus of polymerization, and the conditions for polymerization.

DISCLOSURE OF THE INVENTION

This invention concerns a method for the production of a porous polymer from the HIPE, which is characterized by subjecting the surface of the porous polymer obtained by polymerizing the HIPE to a physical treatment such as chipping. By the treatment, therefore, the porous polymer is enabled to render uniform the texture thereof in the interior and in the surface, enjoy an exalted formation of open cells throughout the porous polymer, and achieve a great improvement in characteristic properties.

Further, this invention allows production of a porous polymer possessed of excellent properties without requiring an appreciable modification in equipment because it is enabled to acquire the inherent effect by simply adding a simple means to perform the physical treatment to the existing equipment. Thus, this invention may well be rated as excelling in terms of cost.

Moreover, since the physical treatment can be performed without reference to the quality of material of the porous polymer and the quality of material of the apparatus for polymerization, this invention allows an addition to the degree of freedom of selection regarding the composition of HIPE, the apparatus for polymerization, and the conditions for polymerization.

BEST MODE FOR EMBODYING THE INVENTION

This invention concerns a method for producing a porous polymer possessed of open cells by polymerizing the HIPE, which is characterized by subjecting the surface of the porous polymer obtained by polymerizing the HIPE to a physical treatment.

Now, the method of this invention for producing the porous polymer will be described below with reference to the component steps thereof arranged in the order of occurrence.

[I] Preparation of HIPE
(1) Raw Material to be Used for HIPE

The raw material to be used for the HIPE is generally required only to contain (a) a polymerizing monomer, (b) a cross-linking monomer, and (c) a surfactant as components for forming an oil phase and (d) water as a component for forming a water phase. It may optionally contain (e) a polymerization initiator, (f) a salt, and (g) other additives as arbitrary components for forming the oil phase and/or the water phase.

(a) Polymerizing Monomer

The polymerizing monomer does not need to be particularly restricted but is only required to have one polymerizing unsaturated group in the molecular unit thereof and to be polymerizable in the HIPE and capable of forming bubbles. The polymerizing monomer preferably contains a (meth) acrylic ester at least partly, more preferably contains the (meth)acrylic ester at a ratio of not less than 20 mass %, and particularly preferably contains the (meth)acrylic ester at a ratio of not less than 35 mass %. By containing such a (meth)acrylic ester as a polymerizing monomer, the porous polymer is improved in plasticity and toughness.

As concrete examples of the polymerizing monomer, allylene monomers such as styrene; monoalkylene allylene monomers such as ethyl styrene, α-methyl styrene, vinyl toluene, and vinyl ethyl benzene; (meth)acrylic esters such as methyl(meth)acrylate, ethyl(meth)acrylate, butyl(meth) acrylate, isobutyl(meth)acrylate, isodecyl(meth)acrylate, 2-ethylhexyl (meth)acrylate, lauryl(meth)acrylate, stearyl (meth)acrylate, cyclohexyl(meth)acrylate, and benzyl(meth) acrylate; chlorine-containing monomers such as vinyl chloride, vinylidenechloride, and chloromethylstyrene; acrylonitrile compounds such as acrylonitrile and methacrylonitrile; and vinyl acetate, vinyl propionate, n-octadecyl acrylamide, ethylene, propylene, and butene may be cited. These polymerizing monomers may be used either singly or in the form of a combination of two or more members.

The quantity of the polymerizing monomer mentioned above to be used is preferred to be in the range of 10–99.9 mass % based on the total quantity of the whole monomer component comprising the polymerizing monomer mentioned above and a cross-linking monomer which will be specifically described herein below. By setting the quantity of the polymerizing monomer in this range, it is made possible to obtain a porous polymer having a fine pore diameter. The quantity of the polymerizing monomer to be used is more preferably in the range of 30–99 mass % and particularly preferably in the range of 30–70 mass %. If the quantity of the polymerizing monomer falls short of 10 mass %, the shortage will be at a disadvantage in posing the possibility of rendering the produced porous polymer brittle and deficient in the ratio of water absorption capacity. Conversely, if the quantity of the polymerizing monomer exceeds 99.9 mass %, the excess will be at a disadvantage in opening the possibility of rendering the produced porous polymer deficient in strength and elastic recovery and of failing to secure fully satisfactory capacity and speed of water absorption.

(b) Cross-linking Monomer

The Cross-linking monomer does not need to be particularly restricted but is only required to possess at least two polymerizing unsaturated groups in the molecular unit thereof and to be polymerizable in the HIPE and capable of forming bubbles similarly to the polymerizing monomer mentioned above.

As concrete examples of the cross-linking monomer, aromatic monomers such as divinyl benzene, trivinyl benzene, divinyl toluene, divinyl xylene, ethyl divinyl benzene, divinyl naphthalene, divinyl alkyl benzenes, divinyl phenanthrene, divinyl biphenyl, divinyl diphenyl methane, divinyl benzyl, divinyl phenyl ether, and divinyl diphenyl sulfide; oxygen-containing monomers such as divinyl furan; sulfur-containing monomers such as divinyl sulfide and divinyl sulfone; aliphatic monomers such as butadiene, isoprene, and pentadiene; and ester compounds of polyhydric alcohols with acrylic acid or methacrylic acid such as ethylene glycol di(meth)acrylate, diethylene glycol di(meth)acrylate, triethylene glycol di(meth)acrylate, polyethylene glycol di(meth)acrylate, 1,3-butane diol di(meth) acrylate, 1,4-butane diol di(meth)acrylate, 1,6-hexane diol di(meth)acrylate, octane diol di(meth)acrylate, decane diol di(methy)acrylate, trimethylol propane di(meth)acrylate, trimethylol propane tri(meth)acrylate, pentaerythritol di(meth) acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra (meth)acrylate, N,N'-methylene bis(meth)acrylamide, triallyl isocyanurate, triallyl amine, tetraallyloxy ethane, and hydroquinone, catechol, resorcinol, and sorbitol may be cited. These cross-linking monomers may be used either singly or in the form of a combination of two or more members.

The quantity of the cross-linking agent to be used is preferably in the range of 0.1–90 mass %, more preferably in the range of 1–70 mass %, and particularly preferably in the range of 30–70 mass %, based on the mass of the whole monomer component comprising the polymerizing monomer and the cross-linking monomer mentioned above. If the quantity of the cross-linking monomer to be used falls short of 0.1 mass %, the shortage will open the possibility of rendering the produced porous polymer deficient in strength and elastic recovery, preventing it from acquiring fully satisfactory capacity for absorption per unit volume or per unit mass, and not enabling it to secure satisfactory capacity and speed of absorption. Conversely, if the quantity of the cross-linking monomer to be used exceeds 90 mass %, the excess will possibly result in embrittling the porous polymer and preventing it from acquiring a sufficient water absorption capacity.

(c) Surfactant

The surfactant does not need to be particularly restricted but is only required to be capable of emulsifying the water phase in the oil phase forming the HIPE. The nonionic surfactants, cationic surfactants, anionic surfactants, and amphoteric surfactants which have been heretofore known to the art are usable.

As concrete examples of the nonionic surfactants, nonylphenol polyethylene oxide adduct; block polymer of ethylene oxide and propylene oxide; sorbitan fatty acid esters such as sorbitan monolaurate, sorbitan monomyristylate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monooleate, decaglycerol trioleate, and self-emulsifying glycerol monostearate; polyoxyethylene alkyl ethers such as polyoxyethylene lauryl ether, polyoxyethylene cetyl ether, polyoxyethylene stearate ether, polyoxyethylene oleyl ether, and polyoxyethylene higher alcohol ethers; polyoxyethylene alkylaryl ethers such as polyoxyethylene nonylphenyl ether; polyoxyethylene sorbitan fatty acid esters such as polyoxyethylene sorbitan monolaurate, polyoxyethylene sorbitan monolaurate, polyoxyethylene sorbitan monopalmitate, polyoxyethylene sorbitan monostearate, polyoxyethylene sorbitan tristearate, polyoxyethylene sorbitan monoolleate, and polyoxyethylene sorbitan trioleate; polyoxy-ethylene sorbitol fatty acid esters such as tetraoleinic acid polyoxyethylene sorbitol; polyoxyethylene fatty acid esters such as polyethylene glycol monolaurate, polyethylene glycol monostearate, polyethylene glycol distearate, and polyethylene glycol monooleate; polyoxyethylene alkyl amines; polyoxyethylene hydrogenated castor oil; and alkyl alkanol amide may be cited. The HLB values of these nonionic surfactants are properly not exceeding 10 and preferably falling in the range of 2–6. These nonionic surfactants may be used in the form of a combination of two or more members. The combined use of such nonionic surfactants possibly results in improving the HIPE in stability.

As concrete examples of the cationic surfactant, quaternary ammonium salts such as stearyl trimethyl ammonium chloride, ditallow dimethyl ammonium methyl sulfate, cetyl trimethyl ammonium chloride, distearyl dimethyl ammonium chloride, alkylbenzyl dimethyl ammonium chloride, and lauryl trimethyl ammonium chloride; alkyl amine salts such as coconut amine acetate and stearyl amine acetate; alkyl betaines such as lauryl betaine, stearyl betaine, and lauryl carboxymethyl hydroxyethyl imidazolinium betaine; and amine oxides such as lauryl dimethyl amine oxide may be cited. By using such a cationic surfactant, it is made possible, though occasionally, to impart an excellent antibacterial property to the produced porous polymer when the porous polymer is utilized as in absorbent.

Incidentally, when a nonionic surfactant and a cationic surfactant are jointly used, they possibly improve the HIPE in stability.

The quantity of the surfactant to be used is preferably in the range of 1–30 parts by mass and more preferably in the range of 3–15 parts by mass, based on 100 parts by mass of the whole monomer component comprising a polymerizing monomer and a cross-linking monomer. If the quantity of the surfactant to be used falls short of 1 part by mass, the shortage will possibly result in rendering the high dispersibility of the HIPE unstable or preventing the surfactant from manifesting fully satisfactorily the action and the effect inherent therein. Conversely, if the quantity of the surfactant to be used exceeds 30 parts by mass, the excess will possibly result in rendering the produced porous polymer excessively brittle. Further, this excess will fail to contribute to economy because it cannot be expected to bring a proportionate addition to the effect inherent therein.

(d) Water

As the water usable effectively herein, the waste water originating in the production of a porous polymer and recovered with the aim of promoting reclamation of a plant effluent may be utilized directly in its unmodified form or after undergoing a prescribed treatment besides tap water, purified water, or deionized water.

The quantity of the water mentioned above to be used may be properly selected to suit the purpose for which the porous polymer possessing open cells is used (such as, for example, water absorbent, oil absorbent, sound insulator, and filter). Specifically, since the void ratio of the porous polymer is decided by changing the water phase/oil phase (W/O) ratio of the HIPE, the quantity of the water to be used is automatically decided by selecting such a W/O ratio as equals a void ratio conforming the use and the object.

(e) Polymerization Initiator

For the purpose of accomplishing the polymerization of HIPE in a very short period of time, it is proper to use a polymerization initiator. This polymerization initiator has to be of such a type as is usable for reverse-phase emulsion polymerization. It may be soluble in water or in oil, whichever better suits the occasion.

As concrete examples of the water-soluble polymerization initiator, azo compounds such as 2,2'-azobis(2-amidinopropane) dihydrochloride; persulfates such as ammonium persulfate, potassium persulfate, and sodium persulfate; and peroxides such as potassium peracetate, sodium peracetate, potassium percarbonate, and sodium percarbonate may be cited.

As concrete examples of the oil-soluble polymerization initiator, peroxides such as cumene hydroperoxide, t-butyl hydroperoxide, t-butyl peroxy-2-ethylhexanoate, di-t-butyl peroxide, diisopropyl benzene hydroperoxide, p-menthane hydroperoxide, 1,1,3,3-tetramethyl butyl hydroperoxide, 2,5-dimethylhexane-2,5-dihydroperoxide, benzoyl peroxide, and methylethyl ketone peroxide may be cited.

These polymerization initiators may be used either singly or in the form of two or more members. When two or more polymerization initiators are used in a combined form, they are preferred to have different 10-hour half-life temperatures, i.e. the temperatures at which the concentrations of the relevant compounds are halves in 10 hours. Naturally, a water-soluble polymerization initiator and an oil-soluble polymerization initiator may be jointly used.

The quantity of the polymerization initiator which is usable in the reverse-phase emulsion polymerization mentioned above is preferably in the range of 0.05–25 parts by mass and more preferably in the range of 1.0–10 parts by mass, based on 100 parts by mass of the whole monomer component comprising a polymerizing monomer and across-linking monomer, though variable with the combination of the monomer component and the polymerization initiator. If the quantity of the polymerization initiator falls short of 0.05 parts by mass, the shortage will open the possibility of increasing the unaltered monomer component and consequently increasing the quantity of the residual monomer in the produced polymer. Conversely, if the quantity of the polymerization initiator exceeds 25 parts by mass, the excess will possibly render the control of polymerization difficult and degrade the porous polymer in mechanical properties.

It is permissible to use a redox polymerization initiator which is formed by combining the polymerization initiator with a reducing agent. The polymerization initiator in this case may be soluble in water or in oil, whichever suits the occasion better. It is also permissible to use a water-soluble redox polymerization initiator and an oil-soluble redox polymerization initiator jointly.

As concrete examples of the water-soluble reducing agent, sodium hydrogen sulfite, potassium hydrogen sulfite, sodium thiosulfate, potassium thiosulfate, L-ascorbic acid, erysorbic acid, ferrous salts, formaldehyde sodium sulfoxylate, glucose, dextrose, triethanol amine, and diethanol amine may be cited. As concrete examples of the oil-soluble reducing agent, dimethyl aniline, tin octylate, and cobalt naphthenate may be cited. These reducing agents of the redox polymerization initiator type may be used either singly or in the form of two or more members.

The ratio of content (ratio by mass) of the reducing agent in the redox polymerization initiator, i.e. polymerization initiator (oxidizing agent)/reducing agent, is in the approximate range of 1/0.01–1/10 and preferably in the range of 1/0.2–1/5.

Incidentally, the polymerization initiator (inclusive of the redox polymerization initiator system) is only required to be present at least during the polymerization of the HIPE. As described specifically herein below, ① it may be added to the oil phase and/or the water phase in advance of the formation of the HIPE, ② it may be added simultaneously with the formation of the HIPE, or ③ it may be added subsequent to the formation of the HIPE. In the case of the redox polymerization initiator system, the polymerization initiator (oxidizing agent) and the reducing agent may be added at different points of time.

(f) Salt

A salt may be used when it is necessary for the purpose of improving the HIPE in stability.

As concrete examples of the salt, halogenides of alkali metals and alkaline earth metals such as calcium chloride, sodium sulfate, sodium chloride, and magnesium sulfate; and water-soluble salts such as sulfates and nitrates may be cited. These salts may be used either singly or in the form of a combination of two or more members. These salts are preferably added to the water phase. Among other salts enumerated above, polyvalent metal salts prove particularly advantageous to the stability of the HIPE during the course of polymerization.

The quantity of the salt to be used is preferably in the range of 0.1–20 parts by mass and more preferably in the range of 0.5–10 parts by mass, based on 100 parts by mass of water. If the quantity of the salt to be used exceeds 20 parts by mass, the excess will induce the wastewater squeezed out of the HIPE to contain a large quantity of salt and increase the cost for the treatment of the wastewater. Further, this excess will make no economic contribution because it cannot be expected to produce a proportionate addition to the inherent effect. If the quantity of the salt to be used falls short of 0.1 part by mass, the shortage will possibly prevent the action and effect of the addition of the salt from being manifested fully satisfactorily.

(g) Other Additive

Other various additives may be used for the purpose of improving the conditions of production and the characteristic properties of the produced HIPE or the performance of the porous polymer. A base and/or a buffer, for example, may be added to adjust the pH. The quantity of such additive to be used is only required to fall in the range in which the addition thereof will induce sufficient manifestation of the performance, function, and economy aimed at. As concrete examples of the additive, activated carbon, inorganic powder, organic powder, metal powder, deodorant, antibacterial agent, mildewproofing agent, perfume, and various macromolecular substances may be cited.

(2) Method for Preparation of HIPE

The method for preparing the HIPE which can be used in this invention does not need to be particularly restricted but may be properly selected from among the heretofore known methods for preparing the HIPE. Now, a typical method for the preparation will be specifically described below.

First, a component for forming an oil phase comprising the aforementioned quantities respectively of a polymerizing monomer, a cross-linking monomer, a surfactant, further an optionally addable oil-soluble polymerization initiator (inclusive of oil-soluble redox polymerization initiator), and other additive is mixed at a prescribed temperature to prepare a homogeneous oil phase.

Meanwhile, a component for forming a water phase comprising the aforementioned quantities respectively of water, an optionally addable water-soluble polymerization initiator (inclusive of a water-soluble redox polymerization initiator), a salt, and other additive was mixed and heated to a prescribed temperature in the range of 30–95° C. to prepare d homogeneous water phase.

Then, the oil phase, i.e. the mixture of the monomer component and the surfactant, and the water phase, i.e. the mixture of water and the water-soluble salt, are joined, efficiently mixed at the HIPE forming temperature (emulsifying temperature) which will be specifically described herein below, placed under proper shearing force, and emulsified to prepare the HIPE stably.

As a method for mixing the water phase and the oil phase to stably preparing the HIPE, the procedure which comprises continuously adding the water phase to the oil phase for several minutes to some tens of minutes while keeping the oil phase in a mixed state proves proper. It is also permissible to produce the target HIPE by mixing part of the water-phase component with the oil-phase component thereby forming a yogurt-like HIPE and thereafter adding the remainder of the water-phase component to the yogurt-like HIPE while mixing them together.

(3) Water Phase/Oil Phase (W/O) Ratio

The water phase/oil phase (W/O) ratio (ratio by mass) of the HIPE obtained as described above does not need to be particularly restricted but may be properly selected, depending on the purpose for which the porous polymer possessing open cells is used (such as, for example, a water absorbent, an oil absorbent, a sound absorbent, a filter). It is properly not less than 3/1, preferably in the range of 10/1–250/1, and particularly preferably in the range of 10/1–100/1. If the W/O ratio falls short of 3/1, the shortage will open the possibility of rendering the porous polymer deficient in the ability to absorb water or energy and in the numerical aperture and suffering the surface of the produced porous polymer to reveal an unduly low numerical aperture and fail to acquire a fully satisfactory liquid passing ability. Since the void ratio of the porous polymer is decided by varying the W/O ratio, it is recommendable to select the W/O ratio so that the void ratio may agree the purpose of use. When the porous polymer is used as a various absorbent like disposable diaper or sanitary material, the W/O ratio is properly in the approximate range of 10/1–100/1. The HIPE which is obtained by mixing the water phase and the oil phase is generally a white highly viscous emulsion.

(4) Apparatus for Production of HIPE

The apparatus for producing the HIPE does not need to be particularly restricted but may be properly selected from the heretofore known apparatuses of production. As the mixing device (emulsifying device) to be used for mixing a water phase and an oil phase, for example, the mixing devices and kneading devices heretofore known are usable. As concrete examples of the mixing device, mixing devices provided with propeller type, paddle type, and turbine type vanes, homomixers, line mixers, and pin mills may be cited. Any of these devices may be adopted.

(5) HIPE Forming Temperature (Emulsifying Temperature)

The HIPE forming temperature (emulsifying temperature) is generally in the range of 20–110° C. From the standpoint of the stability of HIPE, it is preferably in the range of 30–105° C. and more preferably in the range of 40–95° C. If the HIPE forming temperature falls short of 20° C., the shortage will possibly elongate the time required for heating, depending on the hardening temperature. Conversely, if the HIPE forming temperature exceeds 110° C., the excess will possibly render the formed HIPE deficient in stability. For the purpose of curtailing the time required for elevating the temperature of the HIPE to the polymerization temperature in the subsequent step, the formation of HIPE is preferably carried out at the same temperature as the polymerization temperature. It is recommendable to form the target HIPE by adjusting the temperature of the oil phase and/or the water phase in advance at a prescribed forming temperature (emulsifying temperature) and subsequently mixing the two phases and emulsifying the resultant mixture. In the preparation (formation) of the HIPE, since the quantity of the water phase is larger than the quantity of the oil phase, it is proper to adjust the temperature of at least the waste phase to the prescribed forming temperature (emulsifying temperature). When the polymerizing monomer and the cross-linking monomer begin to polymerize while the emulsification is in process, the polymerization will possibly render the HIPE unstable. When the HIPE preparatorily containing the polymerization initiator (inclusive of the redox polymerization initiator) is prepared, therefore, it is proper to set the HIPE forming temperature (emulsifying temperature) at a level at which the polymerization initiator (oxidizing agent) induces substantially no thermal decomposition and it is more proper to perform the emulsification at a temperature lower than the level at which the half life of the polymerization initiator (oxidizing agent) is 10 hours (10-hour half life temperature).

[II] Method for Production of Porous Polymer
(1) Addition of Polymerization Initiator
  (a) Timing for Addition of Polymerization Initiator
  This invention ① adds the polymerization initiator to the water phase and/or the oil phase prior to the formation of the HIPE and then mixing the two phases, ② adds the polymerization initiator at the same time that the HIPE is formed, or ③ adds the polymerization initiator subsequent to the formation of HIPE. In the case of ②, it is permissible to use a redox polymerization initiator similarly to the case of ① which has been already described in the method for the preparation of the HIPE.
  (b) Method for Addition of Polymerization Initiator
  The method of preparatorily adding the polymerization initiator to the oil phase when the polymerization initiator or the reducing agent is soluble in oil or to the water phase when it is soluble in water proves convenient. It is otherwise permissible to adopt the method of adding the oil-soluble polymerization initiator (oxidizing agent) or the emulsion product of the reducing agent to the water phase.
  (c) Mode of Using the Polymerization Initiator
  The polymerization initiator may be used in an undiluted form or in the form of a solution or dispersion in water or an organic solvent. When the polymerization initiator is added at the same time that the HIPE is formed or after the HIPE has been formed, it is important that the added polymerization initiator be mixed quickly and uniformly in the HIPE for the purpose of preventing the monomer component to be polymerized unevenly. Further, the HIPE with which the polymerization initiator has been mixed is quickly introduced into the polymerization vessel or the continuous polymerization apparatus. From this point of view, it is recommended to adopt the method which comprises adding a reducing agent or an oxidizing agent (polymerization initiator) via an inlet path disposed in the path extending from the emulsifier for preparing the HIPE to the polymerization vessel or the continuous polymerization apparatus and mixing the polymerization initiator with the HIPE in a line mixer.
  When the difference between the HIPE forming temperature (emulsifying temperature) and the polymerization temperature is small, the polymerizing monomer or the cross-linking monomer will possibly begin to polymerize while the emulsification is in process owing to the nearness of the emulsifying temperature to the hardening temperature. Since the formation of the porous polymer possibly renders the HIPE unstable, the method to add the reducing agent or the oxidizing agent (polymerization initiator) immediately before the polymerization (the method of ② or ③ mentioned above) proves favorable.
  As concerns the quantity of the polymerization initiator to be used, the description given in the case of ① explained in the method for producing the HIPE is adopted as well.

(2) Polymerization of HIPE
  (a) Method of Polymerization
  The method for polymerizing the HIPE does not need to be particularly restricted but may be properly selected from among the methods of polymerization of HIPE heretofore known to the art. Generally, the polymerization is performed by using the method of standing polymerization under such conditions as is incapable of destroying the structure of water drops dispersed highly in oil of the HIPE. In this case, the HIPE may be polymerized either in the batch pattern which is aimed at polymerizing batch portions of HIPE or in the continuous pattern which is aimed at continuously feeding HIPE in the form of a layer and continuously polymerizing the layer of HIPE.
  This invention is applied particularly effectively to a method which produces a polymer in a shape having many surface parts because it consists in performing a physical treatment on the surface part of a porous polymer. As the method of polymerization, therefore, the continuous polymerization which is capable of facilitating temperature elevation of the HIPE and permitting a continuous physical treatment is preferred over the batch polymerization. It is particularly preferable to adopt a method for continuous polymerization which comprises continuously feeding the HIPE in the form of a layer onto a running belt, for example, and continuously polymerizing the layer of HIPE.
  The HIPE is at a disadvantage in suffering the homogenized oil phase and water phase to deflect and separate in the vertical direction and in being relatively brittle. When the method of continuous polymerization is used, therefore, it is preferred to comprise horizontally conveying the HIPE in the shape of a sheet or a film and meanwhile polymerizing the sheet or film of the HIPE and consequently forming a porous polymer in the shape of a sheet or a film. At this time, such a procedure as is disclosed in International Publication 01/18065A1 may be employed and a process which comprises polymerizing the HIPE in the form of a sheet of certain thickness and cutting the thick sheet of HIPE into thin sheets may be carried out arbitrarily.
  The method for production contemplated by this invention can be applied to the porous polymer that is obtained by any conceivable method. It can be preferably applied to a porous polymer which is continuously polymerized particularly between opposed sheet members or film members.
  (b) Polymerization Temperature
  Though the polymerization temperature of the HIPE of this invention does not need to be particularly restricted, it is generally in the range of 70–150° C. From the viewpoint of the stability and the polymerization rate of the HIPE, it is preferably in the range of 75–110° C., more preferably in the range of 75–105° C., and particularly preferably in the range of 80–100° C. If the polymerization temperature falls short of 70° C., the shortage will be at a disadvantage in requiring such a long time for polymerization as to render the industrial production possibly uneconomical. Conversely, if the polymerization temperature exceeds 150° C., the excess will open up the possibility of disrupting the uniformity of pore diameter of the produced porous polymer or degrading the strength of the porous polymer. The polymerization temperature may be altered at two stages or at more stages during the course of polymerization. This invention does not exclude such mode of carrying out the polymerization.
  (c) Polymerization Time
  The time for polymerization of the HIPE contemplated by this invention is generally in the range of one minute–20 hours. It is preferably within one hour ,more preferably within 30 minutes, and particularly preferably in the range of 1–20 minutes. If the time for polymerization and curing exceeds 20 hours, the excess will possibly result in degrading the productivity to render the production commercially unfavorable. Conversely, if it falls short of one minute, the shortage will possibly degrade the strength of the porous polymer. However, this invention does not exclude the adoption of a longer time for polymerization and curing than the upper limit specified above.

(d) Polymerization Apparatus

The polymerization apparatus that is usable in this invention does not need to be particularly restricted but may be properly selected from among the heretofore known chemical apparatus and put to use as modified to suit the specific method of polymerization. The batch polymerization can utilize a polymerization vessel of the shape conforming to the purpose of use and the continuous polymerization can utilize such a continuous polymerization apparatus as a belt conveyor which is furnished with a compressive roller, for example. Such a polymerization apparatus may have annexed thereto a temperature elevating means and a controlling means which fit the method of polymerization (such as, for example, active thermal energy ray such as microwave or infrared ray which can utilize radiation energy and a temperature elevating means capable of quickly elevating the temperature to the hardening temperature with such a heat medium as hot water or hot wind), though not exclusively. Further, the fact of keeping the surface of the HIPE cast in a polymerization vessel in the case of the batch polymerization and the surface (both upper and lower side) part of the HIPE formed on a driven conveying member such as a conveyor in the case of the continuous polymerization out of contact with the air (precisely, the oxygen component in the air) from the time the polymerization is started till the time the polymerization is completed proves advantageous for the purpose of imparting a suitable open cell structure to the surface part of a porous polymer. It is, therefore, proper to have the surface of HIPE with a various sealing material. The quality of the material for such a polymerization apparatus does not need to be particularly restricted. As concrete examples of the material, metals such as aluminum, iron, and stainless steel (inclusive of alloys thereof); synthetic resins such as polyethylene, polypropylene, fluorocarbon resin, polyvinyl chloride, and unsaturated polyester resin; and fiber-reinforced resin (FRP) formed by reinforcing such synthetic resin with glass fibers or carbon fibers may be cited.

(e) Physical Treatment

This invention has as a principal element for the construction thereof the application of a physical treatment to the surface of a porous polymer obtained by polymerizing the HIPE. The term "physical treatment" as used in this specification means mechanically modifying at least part of the surface. By applying such physical treatment to the surface of a porous polymer, it is made possible to render uniform the structure of both the surface part and the internal part of the porous polymer, heighten the ratio of distribution of open cells in the produced porous polymer, and exalt various absorption properties (such as permeation of liquid into the inner layer, speed of passage of liquid, and absorption volume). It can produce, for example, the effect of repressing the unpleasant sticky feeling on the surface of the porous polymer. Further, since the means for applying the physical treatment can be easily added to the existing equipment, no large modification is required for the equipment. Moreover, since the physical treatment can be performed without reference to the quality of material of the porous polymer or the quality of material of the polymerization apparatus, this invention can add to the degree of freedom of the selection regarding the composition of HIPE, the apparatus for polymerization, and the conditions for polymerization.

The physical treatment is preferably performed at the time that the porous polymer is present in the latter half part of the polymerization apparatus or at the time that the porous polymer extracted from the polymerization apparatus is present in the wet state prior to dehydration.

The physical treatment to be applied to the surface of the porous polymerization does not need to be particularly restricted. It is preferred to be a treatment for shaving the surface of the porous polymer, a treatment for peeling the surface of the porous polymer, or a treatment for causing a crack in the surface of the porous polymer. The physical treatment to the surface of the porous polymer is preferably performed in a thickness within 20 $\mu$m from the surface. The term "shaving" as used in the present specification means removing the skin layer formed on the surface of the porous polymer by using such a mechanical means as brush roll or belt sander (grinding belt coated with metal powder or glass powder), the term "peeling" means removing the skin layer formed on the surface of the porous polymer by using a sticky material, and the expression "causing a crack" means inducing a crack in at least part of the skin layer formed on the surface of the porous polymer by using such a mechanical means as a needle punch or an emboss processing. The expression "removing the skin layer" as used in the present specification means eliminating the function of lowering the ratio of distribution of open cells manifested by the skin layer formed on the surface of the porous polymer and embraces the concept of removing part of the skin layer and heightening the ratio of distribution of open cells besides the concept of perfectly removing the skin layer formed on the surface of the porous polymer.

The method of manufacture contemplated by this invention is enabled by selecting a proper method for performing the physical treatment and controlling the degree of the treatment produced consequently to control freely the numerical aperture of the surface of the produced porous polymer possessing open cells.

Now, the method for subjecting the porous polymer to the physical treatment will be described more specifically below.

(1) The method for shaving the surface of the porous polymer will be described below. The shaving of the surface of the porous polymer can be effected by passing the porous polymer obtained by the polymerization of HIPE between a pair of rotating bodies or mutually meshed rollers possessing an undulating pattern. By this passage, it is made possible to shave the close proximity of the surface of the porous polymer and remove the skin layer and exalt the distribution of open cells. By having the shaving means of this construction incorporated in the continuous polymerization apparatus, it is made possible to apply this invention to the porous polymer produced continuously by the polymerization of HIPE. Though the shaving of the porous polymer does not need to be restricted to the method mentioned above but is only required to be capable of performing the physical treatment on the surface of the porous polymer, the method which shaves the surface of the porous polymer with a pair of rotating bodies while the porous polymer is passing through an area for performing the surface treatment on the surface of the porous polymer proves favorable from the viewpoint of productivity and workability. The rotating bodies for shaving the surface of the porous polymer are preferred to be brushes furnished with bristles. By the rotation of the brushes possessing such bristles while the porous polymer is passing the brushes, the surface of the porous polymer is shaven. The brushes thus used may be made of polypropylene, for example. As a concrete example of the rollers possessing an undulating pattern, roller with minute projection formed on the surface may be cited. The brushes and the rollers can be rotated in mutually opposite directions around their parallel axial lines(counter rotation). By this counter rotation of the opposed brushes or rollers, a various pattern having a different numerical aperture can be formed on the surface of the porous polymer. The method which accomplishes the shaving as described above is effective in being capable of applying the physical treatment in a comparatively wide range.

(2) The method for peeling the surface of the porous polymer will be described below. The peeling of the porous polymer can be accomplished by inducing adhesion of the surface of the porous polymer to a sticky material because this adhesion induces transfer of the skin layer formed on the surface of the porous polymer onto the material side and consequently results in removing the skin layer from the surface of the porous polymer. As concrete examples of the sticky material which is usable in this invention, hydrophilic and hydrophobic woven and non-woven fabrics, paper, and a film having an adhesive superposed on may be cited. The material in the form of a sheet or a tape proves advantageous from the viewpoint of ease of handling. For the adhesive in the laminate, any of various known adhesive may be used on the condition that the adhesive is so watertight as to avoid being peeled in a state impregnated with water or wetted with moisture. As concrete examples of the adhesive which suits this application, acrylic type adhesive having butyl acrylate or 2-ethylhexyl acrylate as an major component, rubber type adhesive having natural rubber or a various synthetic rubbers as an major component, and silicone type adhesive may be cited. These adhesive may be used singly or as a combination of two or more members either directly in an unmodified state or indirectly in a state optionally having incorporated therein a cross-linking agent, a plasticizer, a tackifier, an antioxidant agent, or other additive. Among other adhesive mentioned above, the acrylic type adhesive prove advantageous in terms of such properties as lightfastness, durability, and water resistance. As regards the dimensions of the sticky material, a sheet material conforming to the width of the porous polymer may be effectively used.

For the peeling by the use of such a sticky material, the following method may be used. For a start, the continuous polymerization apparatus for the production of a porous polymer is provided with a drive roll or a drive belt having a sticky material fastened thereto. While the formed porous polymer is passing the site seating the drive roll or the drive belt, part of the surface of the porous polymer is transferred onto the sticky material by virtue of the adhesive force of the sticky material. Incidentally, by causing the continuous apparatus with the drive roll or belt to be provided with a cleaning device, it is made possible to effect continuous removal of the transferred surface layer.

(3) The method for inducing a crack in the surface of the porous polymer will be described below. As a method for inducing a crack in the porous polymer, the method of needle punching is available. This method is aimed at importing open cells to the surface of a porous polymer by vertically moving numerous needles each furnished with minute thorns till they are forced into an absorbent material thereby giving rise to tears in at least part of the skin layer formed on the surface of the porous polymer. The embossing method is similarly aimed at imparting open cells to the surface of a porous polymer by causing rollers with a jogging surface to inflict tears in at least part of the skin layer formed on the surface of the porous polymer. A method which effects impartation of open cells to the surface of a porous polymer by inducing combustion of the surface by means of a heating laser or a corona discharge is also available.

The physical treatment of the surface contemplated by this invention does not need to be limited to the methods mentioned above. Among other methods, the method of shaving the surface of the porous polymer proves particularly advantageous because it is an effective means of easily removing only part of the surface without inflicting any damage on the internal texture of the porous polymer.

The physical treatment for the porous polymer has only to be performed on a limited part of the surface layer of the porous polymer so as to permit formation of through holes in the surface part of the porous polymer. Specifically, it suffices to decide the thickness of treatment, depending on the thickness of the skin layer formed on the surface of the porous polymer. The part subjected to the treatment is preferably in the thickness of not more than 20 $\mu$m, and more preferably not more than 10 $\mu$m in the proximity of the surface. If the range of this treatment from the surface exceeds 20 $\mu$m, the excess will be at a disadvantage in rendering the treatment uneconomical by unduly increasing the waste. Though the range of this treatment is varied with the property to be expected of the, the effect of this invention is fully manifested so long as the physical treatment mentioned above fulfills its function in at least part of the porous polymer or in at least part of the segment of the porous polymer.

From the viewpoint of the operational efficiency, the physical treatment contemplated by this invention is performed preferably at the time when the target porous polymer is in a wet state before dehydration. It may be applied to the porous polymer during or after the step of completing a finished product subsequent to the step of polymerization as specifically described herein below.

(3) Step for Working Porous Polymer into Finished Product (a) Dehydration

The porous polymer formed in consequence of the completion of polymerization is generally dehydrated by compression or suction under vacuum or the combination thereof. By this dehydration, the 50–98 mass % of the water used is removed from the porous polymer and the remainder thereof is retained as deposited in the porous polymer.

The ratio of dehydration is properly set, depending on the use for the porous polymer. Generally, it is set so that the water content may be in the range of 1–10 g, preferably in the range of 1–5 g based on 1 g of the porous polymer in a thoroughly dried state.

(b) Compression

The porous polymer of this invention may be given a state compressed to one out of several parts of the original thickness, depending on the kind of object. The porous polymer in a state compressed in the form of a sheet has a small volume as compared with the volume of the original porous polymer and, therefore, enjoys a reduction in cost of transportation and storage. The porous polymer in the compressed state is characterized by manifesting the quality of absorbing water on exposure to a large volume of water and consequently resuming the original thickness and acquiring a faster water absorbing speed than the polymer in the original thickness.

For the formation of the compressed state, it suffices to adopt a compressing means conforming to the shape of the porous polymer so that the whole volume of the porous polymer may be uniformed compressed under uniform pressure. The porous polymer in the form of a sheet is preferably used in the light of the advantage offered in allowing easy application of uniform pressure throughout the entire surface, permitting use of many existing compressing devices, and warranting ease of operating. In compressing the porous polymer in the form of a sheet, it suffices to dehydrate the porous polymer and pass the dehydrated porous polymer between opposed rolls or belts adjusted to a prescribed distance. When the compression or the suction under vacuum is performed on the porous polymer during the course of the dehydration mentioned above, since this operation generally induces certain decrease in the thickness of the sheet of porous polymer, it is no longer necessary to take the trouble of providing a compressing step when the thickness of the sheet of porous polymer after completion of the dehydration or the suction under vacuum is within the prescribed range. The compression of the porous polymer in a shape other than the sheet (such as, for example, the porous polymer in the form of a cylinder) may be accomplished by using a proper device conforming to the target shape such as, for example, a device having two concentric cylinders disposed one inside the other, with a metal tube incapable of deformation used as the outer cylinder and a rubber tube capable of uniformly and concentrically inflating used as the inner cylinder, so that the compression expected may be attained by introducing air into the inside cylindrical tube till inflation. Otherwise, the compression may be accomplished by setting a rotary shaft conforming to the inside diameter of a cylindrical shaped porous polymer, pressing a roll against the polymer from outside, and rotating the rotary shaft and the roll.

The temperature at which the porous polymer is compressed during the preceding step of dehydration and the present step of compression is preferred to be higher than the glass transition point of the porous polymer. If this temperature is lower than the glass transition point of the porous polymer, the shortage will possibly result in destroying the porous texture or altering the pore diameter.

From the viewpoint of economizing the space for transportation and storage and ensuring ease of handling, the compression is performed effectively to not more than ½ and more effectively to not more than ¼ of the original thickness.

(c) Washing

The porous polymer may be washed with purified water, an aqueous solution containing an arbitrary additive, or a solvent for the purpose of improving the surface condition of the porous polymer.

(d) Drying

The porous polymer which is obtained by the steps described above, when necessary, may be thermally dried with hot wind or microwave or may be humidified for adjustment of water content.

(e) Cutting

The porous polymer obtained by the steps described above, when necessary, may be cut in necessary shape and size and processed to obtain a finished product meeting a target application.

(f) Impregnation

The porous polymer may be given with functionality by being subjected to a process for impregnation of such additives as detergent, perfume, deodorant, and antibacterial agent.

Now, this invention will be described more specifically below with reference to working examples. The percent (%) used in the working examples refers to % by mass unless otherwise specified. In the working examples, the properties of porous polymer reported were determined and evaluated as follows.

<Method for Determination and Calculation of Rate of Liquid Permeation>

Samples obtained by cutting a given porous polymer sheet into squares of 5 cm, and drying and weighing the squares were thoroughly saturated with physiological saline water (aqueous 0.9% NaCl solution). The porous polymer sheet was placed on a glass filter (#0: produced by Duran Corp.) measuring 120 mm in diameter and 5 mm in thickness, with the physically treated surface thereof turned upward. A plate (mass: 352 g) measuring a square of 5 cm, containing at the center thereof a hole 1.5 cm in inside diameter, and raising a cylinder having the same inside diameter as the hole and bearing a scale for volume was placed on the sheet. In the cylinder, 30 ml of physiological saline water was placed. The time required for the physiological saline water in the cylinder to flow through the sample at the volume of 5 ml (from 30 ml to 25 ml) (elapsing time: sec) was measured. The rate of liquid permeation was calculated from the elapsing time in accordance with the formula, rate of liquid permeation (ml/sec)=5 (ml)/elapsing time (sec).

<Free Swelling Ratio>

Samples obtained by cutting a given porous polymer sheet into squares of 1 cm and drying and weighing the squares were impregnated with a sufficient quantity of purified water. The samples inflated with absorbed purified water were left draining on a glass filter (#0: produced by Duran Corp.) measuring 120 mm in diameter and 5 mm in thickness for 30 seconds. The samples containing the absorbed purified water were determined for mass. The free swelling ratio (g/g) of the porous polymer was calculated in accordance with the following formula 1.

free swelling ratio=(mass of sample after absorption−Mass of sample before absorption)/(Mass of sample before absorption)   Formula 1

EXAMPLE 1

Figure 1:
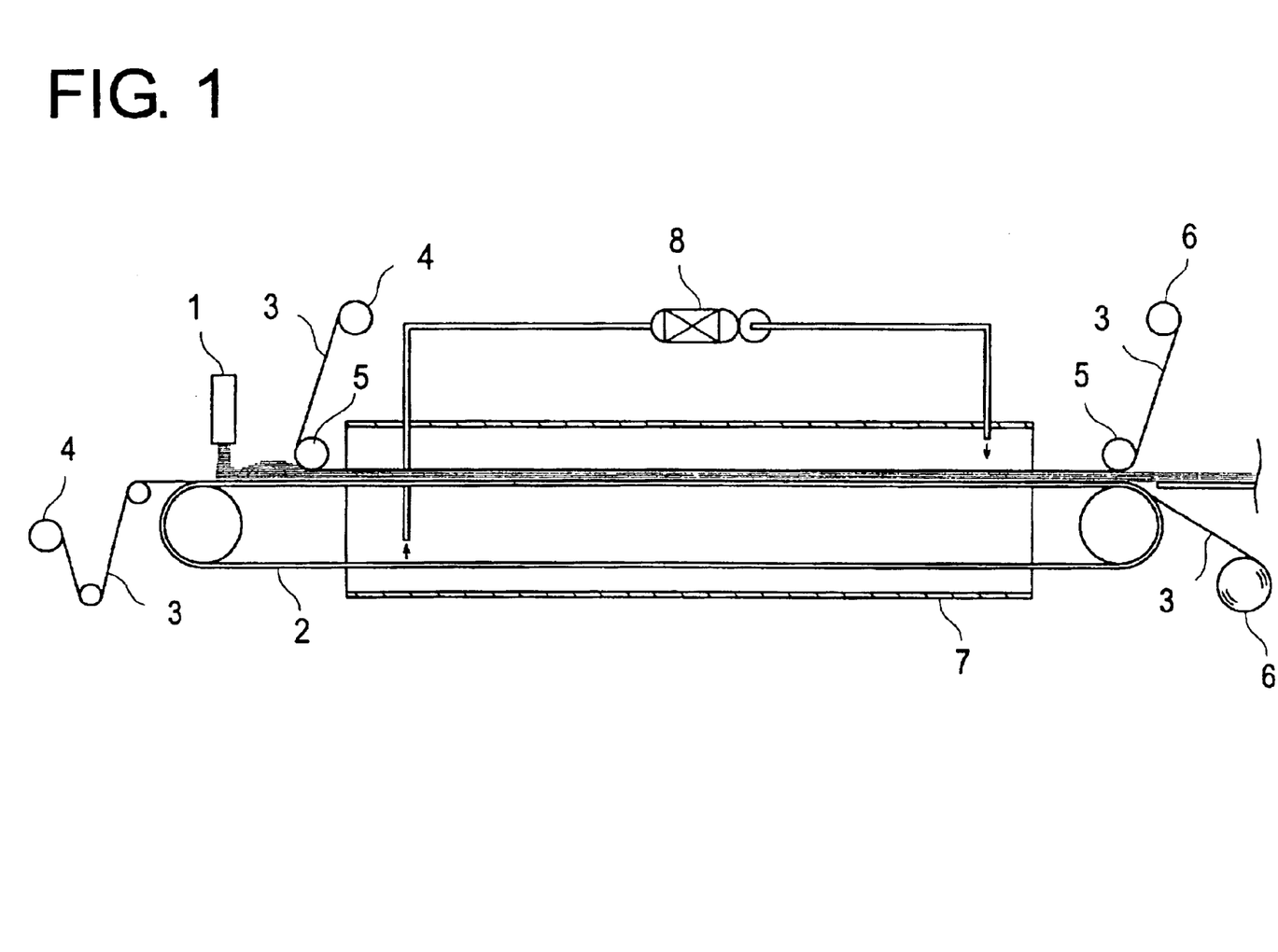
FIG. 1 is a schematic side view illustrating one typical embodiment of the apparatus for continuous polymerization which is one of the polymerizing apparatuses suitable for the method of producing the porous polymer according to this invention. In the diagram, 1 denotes a HIPE supplying device, 2 an endless belt type conveyor, 3 a sheet material, 4 an unwinding roller, 5 a roller, 6 a winding roller, 7 a polymerizing oven, and 8 a heating means.

A water phase to be used for a process of continuous emulsification for the formation of a high water content HIPE was prepared by dissolving anhydrous calcium chloride (20.7 kg) and potassium persulfate (415 g) in purified water (394 L). Then, an oil phase was formed by adding diglycerol monooleate (900 g) to a mixture of styrene (1600 g), 2-ethylhexyl acrylate (4800 g), and 55% divinyl benzene (1600 g). The water phase at a temperature of 80° C. was supplied at a flow rate of 56.5 cm³/sec and the oil phase at a temperature of 22° C. was supplied at a flow rate of 1.88 g/sec respectively to a dynamic mixing device. Inside the dynamic mixing device, the two phases were completely mixed and partly recycled by a pin impeller rotating at 2000 rpm to obtain a high water content HIPE at a rate of 58.4 cm³/sec and a temperature of 79° C. The high water content HIPE thus obtained was cast between opposed sheets (3) of PET film fitted in an apparatus of FIG. 1, adjusted in thickness to 5 mm, and then transferred on a conveyor (2) of the shape of an endless belt. The resultant HIPE plate was polymerized in 60 minutes by being passed at a speed of 15 cm/min inside a polymerization oven (7) having the inner temperature thereof controlled at 80° C. by the use of a heating means (8) to obtain a porous polymer in a wet state. With sand paper as means to apply the physical treatment to the surface of the porous polymer in the wet state, the upper and lower surfaces of the porous polymer plate were each shaven in a thickness of 10 μm (total of 20 μm). The porous polymer which had undergone the physical treatment with sand paper was dehydrated and dried. The produced porous polymer had such a high free swelling ratio of 28 g/g and excelled in the water absorbency. The rate of liquid permeation of the porous polymer was 0.7 ml/sec.

EXAMPLE 2

A high water content HIPE was obtained by following the procedure of Example 1. The high water content HIPE thus obtained was cast between opposed sheets (3) of PET film fitted in an apparatus of FIG. 1, adjusted in thickness to 5 mm, and then transferred on a conveyor (2) of the shape of an endless belt. The resultant HIPE plate was polymerized in 30 minutes by being passed at a speed of 30 cm/min inside a polymerization oven (7) having the inner temperature thereof controlled at 80° C. by the use of a heating means (8) to obtain a porous polymer in a wet state. The porous polymer in the wet state, for the purpose of having the surface thereof subjected to a physical treatment, was continuously passed between opposed brush rolls (measuring 100 mm in outside diameter and 300 mm in width and using straight bristles made of polypropylene in a length of 27 mm) rotated at a peripheral speed of 200 m/min to shave the upper and lower surfaces thereof each in a thickness of 10 $\mu$m(total 20 $\mu$m). No decay was observed in the porous polymer in the wet state. The porous polymer which had undergone the physical treatment with the brush rolls having hard bristles was dehydrated and dried. The consequently obtained porous polymer had such a high free swelling ratio of 28 g/g and excelled in the water absorbency. The rate of liquid permeation was found to be 0.7 ml/sec.

EXAMPLE 3

A water phase and an oil phase for use in a process of continuous emulsification for the formation of a high water content HIPE had the same compositions as in Example 1. The water phase at a temperature of 80° C. was supplied at a flow rate of 54.8 cm$^3$/sec and the oil phase at a temperature of 22° C. was supplied at a flow rate of 3.65 g/sec respectively to a dynamic mixing device. In the dynamic mixing device, the two phases were completely mixed and partly recycled with an impeller rotating at 600 rpm to obtain a high water content HIPE at 58.5 cm$^3$/sec and a temperature of 79° C. The high water content HIPE thus obtained was cast between opposed sheets (3) of PET film fitted in an apparatus of FIG. 1, adjusted in thickness to 5 mm, and then transferred on a conveyor (2) of the shape of an endless belt. The resultant HIPE plate was polymerized in 60 minutes by being passed at a speed of 15 cm/min inside a polymerization oven (7) having the inner temperature thereof controlled at 80° C. by the use of a heating means (8) to obtain a porous polymer in a wet state. With sand paper as means to apply the physical treatment to the surface of the porous polymer in the wet state, the upper and lower surfaces of the porous polymer plate were each shaven in a thickness of 18 $\mu$m (total of 36 $\mu$m). The porous polymer which had undergone the physical treatment with sand paper was dehydrated and dried. The produced porous polymer had such a high free swelling ratio of 14 g/g and excelled in the water absorbency. The rate of liquid permeation of the porous polymer was 0.6 ml/sec.

EXAMPLE 4

A high water content HIPE was obtained by following the procedure of Example 1. The high water content HIPE (250 g) consequently obtained was placed in a case "Pack Ace (600 ml)" and sealed therein with a lid and then polymerized for 60 minutes by being immersed in a water bath to obtain a porous polymer in a wet state. With a sand paper as means to apply a physical treatment to the surface of the porous polymer in the wet sate, the surface part of the porous polymer which touched the case was shaven in a thickness of 18 $\mu$m. The porous polymer which had undergone the physical treatment with the sand paper was sliced in a thickness of 5 mm and then dehydrated and dried. The produced porous polymer had such a high free swelling ratio of 28 g/g and excelled in the water absorbency. The rate of liquid permeation was found to be 0.7 ml/sec.

EXAMPLE 5

A porous polymer in a wet state was obtained by following the procedure of Example 1. With a pinholder as means to apply a physical treatment to the porous polymer in the wet state, the upper and lower surfaces of the porous polymer were partly caused to sustain cracks (each in a thickness of 10 $\mu$m (total 20 $\mu$m). The porous polymer which had undergone the physical treatment with the pinholder was dehydrated and dried. The porous polymer consequently obtained had such a high free swelling ratio of 28 g/g and excelled in the water absorbency. The rate of liquid permeation was found to be 0.35 ml/sec.

EXAMPLE 6

A porous polymer in a wet state was obtained by following the procedure of Example 1. This porous polymer in the wet state was dehydrated and dried. With a sand paper as means to apply a physical treatment to the surface of the porous polymer in the wet state, the upper and lower surfaces of the porous polymer were shaven each in a thickness of 8 $\mu$m (total 16 $\mu$m). The porous polymer consequently obtained had such a high free swelling ratio of 28 g/g and excelled in the water absorbency. The rate of liquid permeation was 0.7 ml/sec.

Comparative Example 1

A porous polymer was obtained by following the procedure of Example 1 while omitting the application of the physical treatment to the surface of the porous polymer in the wet state. The porous polymer consequently obtained had such a high free swelling ratio of 28 g/g and excelled in the water absorbency. The rate of liquid permeation, however, was only 0.07 ml/sec.

Comparative Example 2

A porous polymer was obtained by following the procedure of Example 3 while omitting the application of the physical treatment to the surface of the porous polymer in the wet state. The porous polymer consequently obtained had such a high free swelling ratio of 14 g/g and excelled in the water absorbency. The rate of liquid permeation, however, was only 0.03 ml/sec.

INDUSTRIAL APPLICABILITY

According to this invention which renders the surface and inner textures of a porous polymer more uniform by applying a physical treatment to the surface of the porous polymer, it is made possible to improve greatly the water absorbency, heighten the distribution of open cells in the porous polymer, and permit efficient production of a porous polymer excelling in the absorbency.

The porous polymer produced by this invention can be extensively utilized as (1) liquid absorbents; such as ①cores of disposable diapers, i.e. absorbents for such body fluids as urine and blood and ②treating agents for waste water and spent oil and treating agents for waste solvents, i.e. absorbents for water, aqueous liquids, oils, and organic solvents, (2) energy absorbents, such as sound insulators and heat insulators for automobiles and buildings, i.e. absorbents for sound and heat and (3) bases for chemical agents, such as household goods impregnated with aromatizing agents, detergents, polishing agents, surface protecting agents, and flameproofing agents.

What is claimed is:

1. A method for producing a porous polymer by polymerizing a water-in-oil type high internal phase emulsion, which comprises subjecting a skin layer on the surface of the porous polymer to a physical treatment and removing and discarding at least a part of the skin layer from the porous polymer, wherein the physical treatment is shaving at least a part of the surface of the porous polymer with a brush roll or a belt sander.

2. A method according to claim 1, wherein the physical treatment is subjected to the porous polymer while the porous polymer is in a wet state.

3. A method according to claim 1, wherein the porous polymer is formed in the shape of a sheet by a continuous polymerization apparatus.

4. A method according to claim 1, wherein the physical treatment is performed within the depth of no more than 20 $\mu$m from the surface of the porous polymer.

5. A method according to claim 2, wherein the porous polymer is formed in the shape of a sheet by a continuous polymerization apparatus.

6. A method according to claim 2, wherein the physical is performed within the depth of no more than 20 $\mu$m from the surface of the porous polymer.

7. A method according to claim 3, wherein the physical treatment is performed within the depth of no more than 20 $\mu$m from the surface of the porous polymer.

8. A method according to claim 5, wherein the physical treatment is performed within the depth of no more than 20 $\mu$m from the surface of the porous polymer.

9. A method for producing a porous polymer by polymerizing a water-in-oil type high internal phase emulsion, which comprises subjecting the surface of the porous polymer to a physical treatment, wherein the physical treatment is peeling at least a part of the surface of the porous polymer or inducing a crack in at least a part of the surface of the porous polymer.

10. A method according to claim 9, wherein the physical treatment is subjected to the porous polymer while the porous polymer is in a wet state.

11. A method according to claim 9, wherein the porous polymer is formed in the shape of a sheet by a continuous polymerization apparatus.

12. A method according to claim 10, wherein the porous polymer is formed in the shape of a sheet by a continuous polymerization apparatus.

13. A method according to claim 9, wherein the physical treatment is performed within the depth of no more than 20 $\mu$m from the surface of the porous polymer.

14. A method according to claim 10, wherein the physical treatment is performed within the depth of no more than 20 $\mu$m from the surface of the porous polymer.

15. A method according to claim 11, wherein the physical treatment is performed within the depth of no more than 20 $\mu$m from the surface of the porous polymer.

16. A method according to claim 12, wherein the physical treatment is performed within the depth of no more than 20 $\mu$m from the surface of the porous polymer.

* * * * *